Jan. 14, 1964  A. GUILLANT  3,118,069
PHOTO-ELECTRIC DEVICE FOR DETERMINING RELATIVE POSITIONS
Filed Feb. 13, 1961
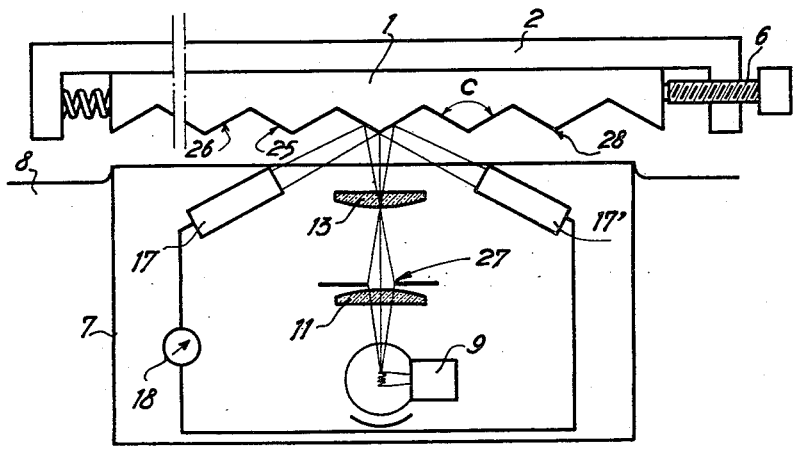
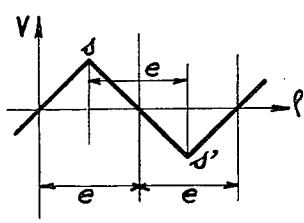
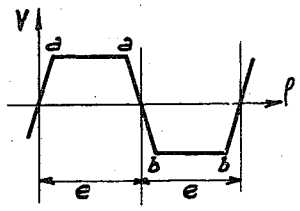
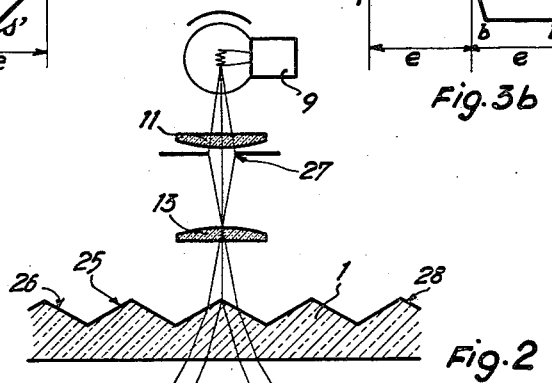
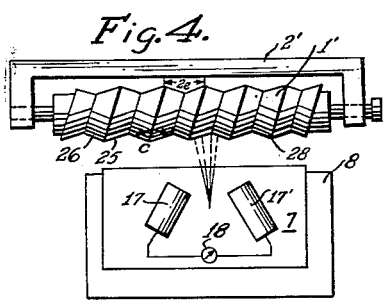

United States Patent Office 3,118,069
Patented Jan. 14, 1964

3,118,069
PHOTO-ELECTRIC DEVICE FOR DETERMINING RELATIVE POSITIONS
André Guillant, Paris, France, assignor to Optique et Precision de Levallois, Levallois-Perret, France, a company of France
Filed Feb. 13, 1961, Ser. No. 88,892
Claims priority, application France Feb. 23, 1960
5 Claims. (Cl. 250—231)

In French Patent No. 1,213,598, there has been described an apparatus which enables the relative positions of two objects to be checked, determined or controlled with precision by photo-electric means.

The two objects are movable with respect to each other and comprise respectively a photo-electric reading device and a uniform reference scale. The reading device comprises a head provided with two light-sensitive elements connected electrically in opposition, while the reference scale has a uniform succession of the same width in the direction of relative displacement of the two objects. In addition, a lens focussed on the reference scale transmits a light beam on to the said scale.

In the form of embodiment described in the above-mentioned patent, the reference scale is constituted by a regular succession of dark and light elements, and the beam of light from the lens is directed on two adjacent elements of the said scale. The light coming from the two elements of the scale is divided on a separating member into two separate beams which are received by the two light-sensitive elements. In this way, at the output of the light-sensitive elements which are connected in opposition, there is obtained a signal which varies in a continuous manner following the movement of the reading device with respect to the scale, from one element of the scale to the other. This signal can be utilized to check the relative position of the two objects, or to control their relative positions.

In accordance with the present invention, the reference scale is arranged so as to play itself the part of the separator member, in such manner that there is projected on the said element the image of a grid formed of dark and clear zones, or of a simple light slot representing a clear calibrated zone between two dark zones.

The lens and the device which gives the dark and clear zones on the one hand, and the light-sensive elements on the other, can be located on the same side of the scale, which then carries out the separation by reflection. These elements may also be located on each side of the scale which is of transparent material, and the separation is then effected by refraction.

The description which follows below with reference to the accompanying drawings, which are given by way of example only and without implied limitation, will make it easy to understand the different special features of the invention and the method by which they are produced, any arrangement brought out either in the text or the drawings being understood to fall within the scope of the present invention.

FIG. 1 shows diagrammatically a photo-electric apparatus in accordance with the invention;

FIG. 2 is a similar view of an alternative form of construction;

FIGS. 3a and 3b show the variations of the resultant signal in two different cases; and FIG. 4 shows diagrammatically an alternative embodiment of the invention.

In the drawings, there is shown at 1 a part of the reference element which ensures at the same time the separation of the light beams which it receives and which can be moved in a suitable support 2 by a device such as a precision screw 6. To this end, the reference element is a rack having a triangular profile with an apex angle $c$ and a tooth pitch $2e$ (the distance between two consecutive elements of the same kind). In the form of embodiment shown in FIG. 1, all the flanks of the saw-tooth profile, such as 25 and 26, are reflecting.

In this example, the reading head 7 is fixed on a frame 8.

On this reading head, a lamp 9 provides the illumination of a slot 27 perpendicular to the scale 1, by means of a condenser 11. A lens 13 gives an image of this slot in the plane of one of the crests 28 of the reference element. Light-sensitive elements 17 and 17', arranged on the same side of the scale 1 as the optical system which has just been described, are directed in such manner that each of them receives respectively the light reflected by each of the flanks 25—26 of the profile 1. The width of the image of the slot formed on the reference element has a maximum value equal to the half-pitch $e$ of the toothed rack.

The two light-sensitive elements such as the photo-diodes 17 and 17', are electrically connected in opposition, and, after amplification by known means (not shown), the resultant of their effects actuates a suitable measuring instrument 18. The potential differences supplied by the photo-diodes can be utilized after amplification, to actuate a relay or a speed-varying gear, for example.

The relative position of the lens and the reference separator device, which is known to the nearest tooth pitch by any usual approximation means (not shown) defines with accuracy the position of the image of the slot 27 on the reference scale 1.

If the lens is exactly opposite a crest 28, the two photo-diodes 17 and 17' receive equal quantities of light and therefore give a zero potential difference. If the reading head 7 moves with respect to the reference member 1, for example towards the right of FIG. 1, the photo-diode 17 receives less and less light, while the photo-diode 17' receives an increasing quantity of light. As the two photo-diodes are connected in opposition, a potential difference will result between 17' and 17, 17' having the highest potential. This difference will increase as the lens is displaced in front of the reference scale, and, if the image of the slot has a width equal to a half-pitch $e$, the maximum potential difference will be obtained when the lens is substantially half-way between a crest and a trough of the saw-tooth profile.

The potential difference will thereafter decrease (the potential of 17 increasing while that of 17' decreases) until it becomes zero when the lens is exactly in front of a trough of the reference scale. If the relative movement continues in the same direction, the potential difference between 17' and 17 will again increase in absolute value, but will be of opposite sign, the potential of 17 becoming higher than that of 17'.

The response obtained has the form of a saw-toothed curve in the case of an image of the slot 27 having a width equal to a half-pitch $e$, as indicated in FIG. 3a.

It will be noted that the zero potential difference occurs very exactly at every half-pitch (which makes the use of a zero instrument possible), but also that in order to obtain an identical response, it is necessary to move through a distance of a full pitch so as again to come in front of a face of the same kind.

It follows from the above that not only does the apparatus register the passage of a crest 28 or a trough of the scale 1 in front of the objective (zero position) but it gives in addition the value of the displacement which may exist. Within the extent of a half-pitch, this indication is given by the value of the potential difference between the photo-diodes, which also indicates the direction of movement necessary to return to zero, this direction being characterized, within the limits of one pitch, by the positive or negative sign of the response. These indications given in electrical form, may be employed to control a servo-mechanism acting on the support of the member whose position it is desired to correct, in order to bring it back automatically to the zero position.

For the purposes of interpolation within one pitch, either the value of the response may be read directly on an electrical measuring instrument, or one of the elements can be moved with respect to the other (for example by displacing the reference member 1 with respect to its support 2 by means of the precision screw 6), or finally by displacing the slot 27 with respect to the optical axis by means of a precision device.

In the case of a slot image having a width less than a half-pitch $e$, the response curve obtained has the form of a trapezoidal curve such as shown in FIG. 3b. The system is then adapted only to operate as a zero apparatus, the zone in which the response is proportional to the displacement being then very small, corresponding to the inclined portions $a$ and $b$ of the curve, the abscissae of which are closer together than those of the crests $s$ and $s'$ of the curve 3a, the latter being separated by a half-pitch $e$.

Instead of a toothed rack such as shown in FIG. 1, the reference member may be constituted by a cylindrical member 1' threaded with a triangular profile having an apex angle $c$ and a tooth-pitch of 2e. This is shown in FIG. 4 wherein the support 2 of FIG. 1 is replaced by a similar support 2' carrying a movable substantially cylindrical rod member 1' provided with a helicoidal thread having a triangular profile as mentioned above. It is evident that in the plane common to the axis of the member 1' and to the beam of light impinging thereon, the threaded member 1' offers triangular projections equivalent to the teeth of the rack 1 of FIG. 1. In the same way, without departing from the scope of the present invention, the reflecting reference member of FIG. 1 may be replaced by a similar member made of transparent material as shown in FIG. 2. In this case, the separation takes place by refraction on the flanks 25, 26 of the teeth of the reference member 1, and the latter is located between the optical system of the light source and the light-sensitive elements 17 and 17'.

What is claimed is:

1. A photo-electric apparatus for determining the relative positions of two objects of which one is movable in parallel relationship with respect to the other, comprising, in combination, projector means carried by one of said objects and projecting a beam of light of predetermined width in a direction transverse of the direction of movability of said one of said objects; an elongated optical separator member arranged on the other one of said objects and extending in said direction of movability thereof, said separator member being arranged opposite said projector means and therefore movable across said beam of light for being illuminated on one side and comprising a series of longitudinally aligned identical projections having each a triangular profile located in the plane common to said direction of movability and to said beam of light and thereby separating said beam of light into two beam portions having an intensity ratio depending upon which portions of said triangular profile of a particular projection on either side of its apex is illuminated by said beam of light, said projections being uniformly spaced from each other and constituting a reference scale for measuring the longitudinal displacement of said one of said objects relative to the other in scale units corresponding to the spacing of said projections; and photo-electric means arranged on said one of said objects for receiving said two beam portions and for furnishing an electrical signal indicating by its magnitude said beam portion intensity ratio and thereby in any relative position of said objects the amount of deviation of the center of said beam of light from the apex of a particular projection illuminated by said beam of light.

2. A photo-electric apparatus for determining the relative positions of two objects of which one is movable in parallel relationship with respect to the other, comprising, in combination, projector means carried by one of said objects and projecting a beam of light of predetermined width in a direction transverse of the direction of movability of said one of said objects; an elongated optical separator member arranged on the other one of said objects and extending in said direction of movability thereof, said separator member being arranged opposite said projector means and therefore movable across said beam of light for being illuminated on one side and comprising a bar provided with a series of longitudinally aligned identical projections having each a triangular profile located in the plane common to said direction of movability and to said beam of light and thereby separating said beam of light into two beam portions having an intensity ratio depending upon which portions of said triangular profile of a particular projection on either side of its apex is illuminated by said beam of light, said projections being uniformly spaced from each other and constituting a reference scale for measuring the longitudinal displacement of said one of said objects relative to the other in scale units corresponding to the spacing of said projections; and photo-electric means arranged on said one of said objects for receiving said two beam portions and for furnishing an electrical signal indicating by its magnitude said beam portion intensity ratio and thereby in any relative position of said objects the amount of deviation of the center of said beam of light from the apex of a particular projection illuminated by said beam of light.

3. A photo-electric apparatus for determining the relative positions of two objects of which one is movable in parallel relationship with respect to the other, comprising, in combination, projector means carried by one of said objects and projecting a beam of light of predetermined width in a direction transverse of the direction of movability of said one of said objects; an elongated optical separator member arranged on the other one of said objects and extending in said direction of movability thereof, said separator member being arranged opposite said projector means and therefore movable across said beam of light for being illuminated on one side and comprising a substantially cylindrical rod provided with a helicoidal thread of triangular profile constituting a series of longitudinally aligned identical projections having each a triangular profile located in the plane common to said direction of movability and to said beam of light and thereby separating said beam of light into two beam portions having an intensity ratio depending upon which portions of said triangular profile of a particular projection on either side of its apex is illuminated by said beam of light, said projections being uniformly spaced from each other and constituting a reference scale for measuring the longitudinal displacement of said one of said objects relative to the other in scale units corresponding to the spacing of said projections; and photo-electric means arranged on said one of said objects for receiving said two beam portions and for furnishing an electrical signal indicating by its magnitude said beam portion intensity ratio and thereby in any relative position of said objects the amount of deviation of the center of said beam of light from the apex of a particular projection illuminated by said beam of light.

4. A photo-electric apparatus for determining the relative positions of two objects of which one is movable in parallel relationship with respect to the other, comprising, in combination, projector means carried by one of said objects and projecting a beam of light of predetermined width in a direction transverse of the direction of movability of said one of said objects; an elongated optical separator member arranged on the other one of said objects and extending in said direction of movability thereof, said separator member being arranged opposite said projector means and therefore movable across said beam of light for being illuminated on one side and comprising on said one side a series of longitudinally aligned identical projections having each a triangular profile having light reflecting flanks located in the plane common to said direction of movability and to said beam of light and thereby separating said beam of light by reflection into two beam portions having an intensity ratio depending upon which portions of said triangular profile of a particular projection on either side of its apex is illuminated by said beam of light, said projections being uniformly spaced from each other and constituting a reference scale for measuring the longitudinal displacement of said one of said objects relative to the other in scale units corresponding to the spacing of said projections; and photo-electric means arranged on said one of said objects in a positional relation for receiving said two reflected beam portions and for furnishing an electrical signal indicating by its magnitude said beam portion intensity ratio and thereby in any relative position of said objects the amount of deviation of the center of said beam of light from the apex of a particular projection illuminated by said beam of light.

5. A photo-electric apparatus for determining the relative positions of two objects of which one is movable in parallel relationship with respect to the other, comprising, in combination, projector means carried by one of said objects and projecting a beam of light of predetermined width in a direction transverse of the direction of movability of said one of said objects; an elongated transparent optical separator member arranged on the other one of said objects and extending in said direction of movability thereof, said separator member being arranged opposite said projector means and therefore movable across said beam of light for being illuminated on one side and comprising on its opposite side a series of longitudinally aligned identical projections having each a triangular profile located in the plane common to said direction of movability and to said beam of light and thereby separating said beam of light by refraction into two beam portions having an intensity ratio depending upon which portions of said triangular profile of a particular projection on either side of its apex is illuminated by said beam of light passing through said transparent separator member, said projections being uniformly spaced from each other and constituting a reference scale for measuring the longitudinal displacement of said one of said objects relative to the other in scale units corresponding to the spacing of said projections; and photo-electric means arranged on said one of said objects for receiving said two beam portions and for furnishing an electrical signal indicating by its magnitude said beam portion intensity ratio and thereby in any relative position of said objects the amount of deviation of the center of said beam of light from the apex of a particular projection illuminated by said beam of light.

References Cited in the file of this patent
UNITED STATES PATENTS

| | | |
|---|---|---|
| 1,897,850 | La Pierre | Feb. 14, 1933 |
| 2,286,820 | Lenehan | June 16, 1942 |
| 2,304,814 | Glasser | Dec. 15, 1942 |
| 2,692,527 | Wetzel et al. | Oct. 26, 1954 |
| 2,810,315 | Miller | Oct. 22, 1957 |
| 2,817,691 | Hutchins | Dec. 24, 1957 |
| 2,886,718 | Shepherd | May 12, 1959 |